(12) United States Patent
Friedel (10) Patent No.: US 9,956,570 B2
(45) Date of Patent: May 1, 2018

(54) DEVICE FOR TREATING OBJECTS (71) Applicant: Eisenmann SE, Boeblingen (DE)

(72) Inventor: Michael Friedel, Boeblingen (DE)

(73) Assignee: EISENMANN SE, Boeblingen (DE)

( * ) Notice: Subject to any disclaimer, the term of this patent is extended or adjusted under 35 U.S.C. 154(b) by 0 days. days.

(21) Appl. No.: 15/506,354

(22) PCT Filed: Jul. 31, 2015

(86) PCT No.: PCT/EP2015/001585
§ 371 (c)(1),
(2) Date: Feb. 24, 2017

(87) PCT Pub. No.: WO2016/029989
PCT Pub. Date: Mar. 3, 2016

(65) Prior Publication Data
US 2017/0252767 A1    Sep. 7, 2017

(30) Foreign Application Priority Data

Aug. 27, 2014  (DE) ........................ 10 2014 012 595

(51) Int. Cl.
*B05B 15/04* (2006.01)
*B05B 13/04* (2006.01)
(Continued)

(52) U.S. Cl.
CPC ...... *B05B 15/0462* (2013.01); *B05B 13/0452* (2013.01); *B05B 15/1214* (2013.01);
(Continued)

(58) Field of Classification Search
None
See application file for complete search history.

(56) References Cited

U.S. PATENT DOCUMENTS 3,473,404 A * 10/1969 Ross ................... B60K 20/04
                                                           74/491
4,089,270 A *  5/1978 Blake .................. B61B 13/04
                                                           104/102
(Continued)

FOREIGN PATENT DOCUMENTS

DE    694 03 485 T2    2/1998
DE    198 20 527 C1    1/2000
(Continued)

*Primary Examiner* — Jethro M Pence (57) ABSTRACT

A device for treating objects, wherein a gap is formed between two wall sections of a treatment chamber. At least one respective component of at least one first and one second working device which can move along the gap, extends from an outer region outside of the treatment chamber through the gap into the treatment chamber. A covering assembly seals the gap in the wall of the treatment chamber, apart from a first through opening and a second through opening, through which the component of the first working device or the component of the second working device extend, and which follow a movement of the component of the first working device or the component of the second working device along the gap. A covering band running on the gap is secured to a first and to a second securing side of the first working device, said first and second securing sides facing one another in the longitudinal direction of the gap. A diverting device, directs the covering band from the first securing side to the second securing side of the first working device, and also from the first securing side of the first working device to the second working device, where it is lifted away from the gap using a lifting device and directed past the second working device.

10 Claims, 4 Drawing Sheets (51) Int. Cl.
   *B25J 11/00*  (2006.01)
   *B25J 19/00*  (2006.01)
   *B25J 21/00*  (2006.01)
   *B05B 15/12*  (2006.01)
   *B25J 5/02*   (2006.01)
   *B25J 9/00*   (2006.01)

(52) U.S. Cl.
   CPC .............. *B25J 5/02* (2013.01); *B25J 9/0084* (2013.01); *B25J 11/0075* (2013.01); *B25J 19/0075* (2013.01); *B25J 21/00* (2013.01); *Y10S 901/43* (2013.01)

(56) References Cited

U.S. PATENT DOCUMENTS

| | | | | |
|---|---|---|---|---|
| 4,689,757 A * | 8/1987 | Downing | ................ | G07C 3/08 341/101 |
| 4,892,041 A * | 1/1990 | Fukuda | ................... | B61B 5/025 104/140 |
| 4,964,359 A * | 10/1990 | Richmond | ......... | F16H 59/0213 116/28.1 |
| 5,031,944 A * | 7/1991 | Keyaki | ................ | A44B 19/301 24/387 |
| 5,427,619 A | 6/1995 | Ehinger et al. | | |
| 6,397,758 B1 * | 6/2002 | Martin | .................... | E21B 19/14 104/139 |
| 6,499,408 B1 * | 12/2002 | Kundel, Sr. | ............... | B61B 3/00 104/111 |
| 6,928,703 B2 * | 8/2005 | Petravic | ............... | A44B 19/265 24/381 |
| 7,077,240 B2 * | 7/2006 | Itoh | .................... | B66B 11/0095 187/249 |
| 9,004,496 B2 * | 4/2015 | Gorham | ................ | F16J 15/062 277/650 |
| 2008/0223296 A1 | 9/2008 | Giardini | | |

FOREIGN PATENT DOCUMENTS

| | | |
|---|---|---|
| DE | 299 18 795 U1 | 1/2000 |
| DE | 10 2012 211 135 A1 | 1/2014 |
| EP | 1 095 715 A2 | 5/2001 |
| EP | 1 277 521 A2 | 1/2003 |
| JP | H09-239302 A | 9/1997 |
| WO | 95/09697 A1 | 4/1995 |
| WO | 2007/014815 A1 | 2/2007 |

* cited by examiner

DEVICE FOR TREATING OBJECTS

RELATED APPLICATIONS

This application is a national phase of International Patent Application No. PCT/EP2015/001585, filed Jul. 31, 2015, which claims the filing benefit of German Patent Application No. 10 2014 012 595.5, filed Aug. 27, 2014, the contents of both of which are incorporated herein by reference.

FIELD OF THE INVENTION

The invention relates to a device for treating objects, having
a) a treatment chamber, which has at least one wall having a first wall section and having a second wall section, wherein a gap extending in the wall is formed between the wall sections;
b) at least one first and one second working unit, in particular painting robots, which each comprise at least one component which extends from an outer region outside the treatment chamber through the gap into the treatment chamber, wherein the working units can be moved along the gap;
c) a covering assembly, which seals the gap in the wall of the treatment chamber, apart from
  ca) a first through opening, through which the at least one component of the first working unit extends and which follows a movement of the at least one component of the first working unit along the gap;
  cb) a second through opening, through which the at least one component of the second working unit extends and which follows a movement of the at least one component of the second working unit along the gap.

BACKGROUND OF THE INVENTION

For the industrial treatment of objects, in particular vehicle bodies or the parts thereof, in which large piece numbers have to be processed, preference is given to the use of devices of the type stated at the outset in which the objects can be guided continuously or discontinuously through the treatment chamber by means of a conveying appliance. Such devices have a high capacity and are well suited to being incorporated into a production line. Treatment can be painting or drying, for example.

The walls of the treatment chamber separate the latter from an outer region and, in particular, prevent any treatment medium applied and/or heat from escaping from the treatment chamber into said outer region. The term "wall" can be taken to mean any parts of a casing or of a housing of the treatment chamber, e.g. a side wall, a bottom wall or a top wall. A wall can, for example, also be a wall of a housing of some other subassembly which is arranged in the treatment chamber. For example, the wall can belong to the housing of a cover for a guide track on which a working unit, e.g. an application robot, is moved.

The walls of the treatment chamber and the sealing thereof are intended, for example, to prevent liquids, gases and/or vapors of the kind that may be present in painting or drying booths, for example, from escaping from the treatment chamber. In painting booths, there is also, for example, the intention of keeping clouds of liquid or powder away from the environment of the treatment chamber. The intention is also, for example, to prevent dirt from penetrating into the interior of the treatment chamber from outside.

In the present context, the term "sealing" does not necessarily imply hermetic sealing of the adjacent regions, i.e. the treatment chamber and the outer region. The aim is to achieve acceptable residual leakage, which is appropriate to requirements and may be different from one plant to another.

A working unit can be, for example, a treatment unit and, in particular, a multi-axis application or painting robot, which guides an application unit, e.g. a spray gun or a rotary atomizer, at an end of a robot arm which is situated in the treatment chamber. Said working unit can also be, for example, a conveying appliance and can have a support arm for supporting objects, which is situated in the treatment chamber. Drive components of the conveying appliance, from which contaminants may usually originate, are advantageously arranged in the outer region away from the treatment chamber.

Known devices of the type stated at the outset are often of complex construction and are fault-prone, especially in respect of the means provided for sealing the opening.

EP 1 277 521 A2, for example, discloses a covering band for a housing opening of a coating installation, wherein carriages for moving coating devices are provided on a rail structure of the coating installation in such a way that they can be moved along a slot-type housing opening. There, the housing opening is covered by a stationary covering band, which is fastened on the housing and which is lifted away from the housing opening by a lifting device on the carriage during movement of the carriages. In the case of this stationary covering band, cleaning of the covering band contaminated with impurities from the treatment chamber can be accomplished only from the same side as the treatment chamber.

Another covering assembly for a booth, in particular a painting booth, is described in DE 10 2012 211 135 A1. There, the covering assembly has a multiplicity of seal elements for a slot-shaped opening extending in a longitudinal direction in a wall of a booth, said seal elements being arranged in succession in the longitudinal direction, covering the opening. The seal elements are mounted on a holding device fixed relative to the wall, wherein the seal elements are mounted pivotably on the holding device. Here, the mechanical complexity is very high.

SUMMARY OF THE INVENTION

It is an object of the present invention to provide a device of the type stated at the outset which is of as simple a configuration as possible in respect of its implementation and maintenance and in which the disadvantages of the prior art are avoided.

This object is achieved, in the case of a device of the type stated at the outset, by virtue of the fact that
d) the covering assembly comprises a covering band, which extends at the gap and which is fastened on a first fastening side and on a second fastening side of the first working unit, wherein the two fastening sides lie opposite one another in the longitudinal direction of the gap;
wherein
e) the covering band is guided by means of a deflection device from the first fastening side to the second fastening side of the first working unit;
f) the covering band is guided from the first fastening side of the first working unit to the second working unit, where it is lifted away from the gap by means of a lifting device and guided past the second working unit.

By virtue of these measures according to the invention, the covering band is not stationary, since it is moved during a movement of the first working unit. Thus, sections of the covering band which have been contaminated from the treatment chamber, in particular by a movement of the first working unit, can be guided away from the gap, e.g. into the outer region. There, cleaning can be performed without the need to enter the treatment chamber, for which purpose it would be necessary to halt operations. It is then possible, for example, to install in the outer region an automatic cleaning device, through which the covering band can be guided and cleaned at the same time.

Moreover, sufficient covering and sealing of the gap can be achieved with a single covering band.

It is advantageous if the covering band is fastened on the first working unit on both fastening sides. This makes it possible to dispense with a covering-band fastening device, mounted in such a way as to be separately movable, on the first working unit.

This is particularly advantageous if the deflection device is arranged in the outer region. In this case, there is no risk of contamination of the sections of the covering band which are not situated at the gap.

The deflection device preferably comprises a plurality of deflection units for the covering band, thus allowing the latter to be guided and deflected reliably.

In practice, it has been found advantageous here if the deflection units each comprise a deflection roller or a deflection surface for the covering band.

It is particularly advantageous if the lifting device is supported by the second working unit.

In order to ensure reliable guidance of the covering band in the case of the lifting device as well, the lifting device preferably comprises a plurality of lifting/deflection units.

It is advantageous here if the lifting/deflection units each comprise a deflection roller or a deflection surface for the covering band.

If the first and the second wall section extend in a vertical plane, with the result that the gap also extends in a vertical plane, this takes account of a frequently encountered arrangement of working units.

As an alternative, the first and the second wall section can be comprised by a horizontal wall part of the wall, with the result that the gap also extends in a horizontal plane. If the working-unit components passing through the gap extend downward through this gap, there is a kind of shading of the gap by the wall, ensuring that there is already a certain reduction in contact with contaminants in the treatment chamber.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Illustrative embodiments of the invention are explained in greater detail below with reference to the drawings, in which.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
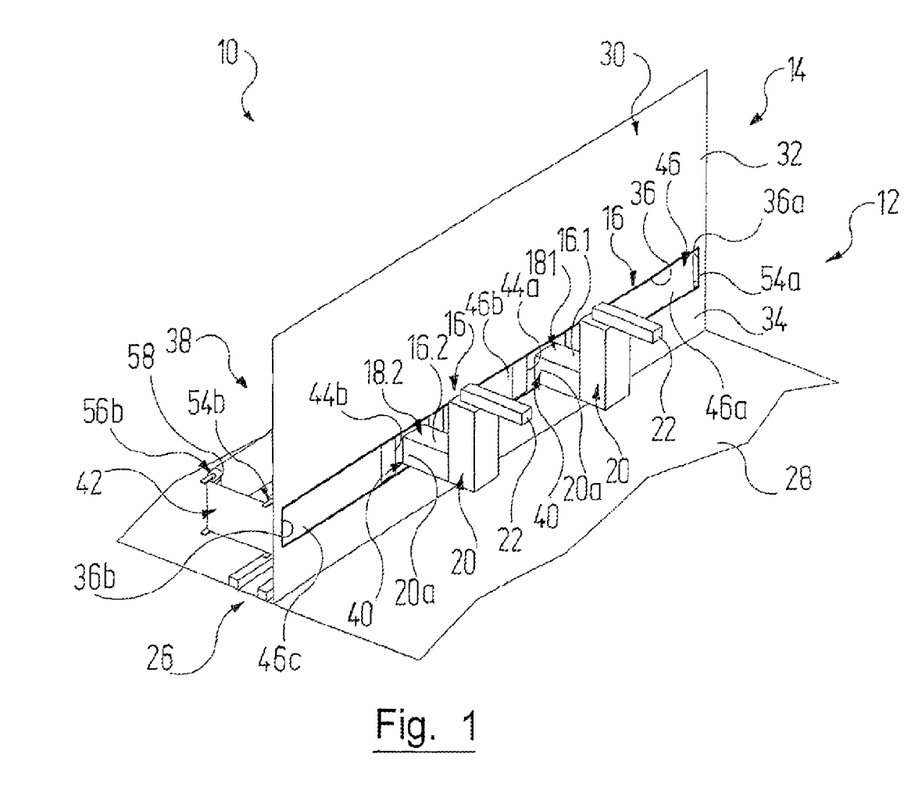
FIG. 1 shows, in perspective, a detail of a painting booth in accordance with a first illustrative embodiment, having a booth wall, in which there is a gap between two vertical wall sections, through which two working units extend into a treatment chamber, wherein the gap is covered by a covering assembly.

In FIG. 1, 10 denotes overall a device for treating objects which comprises a treatment chamber 12. In the illustrative embodiment under consideration, the treatment chamber 12 belongs to a painting booth 14 in which objects are painted and of which only a segment is shown.

In the treatment chamber 12 there are two working units 16, which are designed as treatment units 16.1 and 16.2 in the illustrative embodiment under consideration. The treatment units 16.1, 16.2 are each illustrated by a multi-axis painting robot 18.1 and 18.2 of the kind known per se, which is shown in highly schematized form.

Each painting robot 18.1, 18.2 comprises a robot arm 20, which guides an application unit 22 at its free end, which application unit can be a paint gun or a rotary atomizer, for example.

The robot arm 20 is arranged on a carriage 24, which can be moved on rails 26 in the treatment chamber 12 and, for this purpose, incorporates drive components (not shown specially here) in a known manner.

The treatment chamber 12 is bounded by walls, of which a bottom wall 28 and a vertical side wall 30 can be seen. The side wall 30 has a first wall section 32 and a second wall section 34, which are separated from one another by a gap 36 extending in the horizontal direction and having a longitudinal direction.

In the illustrative embodiment under consideration, the first wall section 32 and the second wall section 34 extend in a vertical plane, as a result of which the gap 36 also extends in a vertical plane.

On the side of the side wall 30 away from the treatment chamber 12 there is an outer region 38 outside the treatment chamber 12 of the painting booth 14, from which region the painting robot is supplied with operating media, such as electric power, fluid media and the like, which are necessary for the operation of the painting robot 18 and for painting the objects. For this purpose, supply lines (not shown specially) are passed to the painting robot 18, as is known per se.

The gap 36 is designed in such a way that such lines and/or components can be passed from the outer region 38, through the gap 36, into the treatment chamber 12 of the painting booth 14. In particular, moving lines and/or components can be passed through the gap 36.

In the illustrative embodiment under consideration, the rails 26 and the carriage 24 of the painting robot 14 are arranged in the outer region 38. Starting from the carriage 24, a respective component 40 of the working units 16 passes through the gap 36 into the treatment chamber 12. In the illustrative embodiment under consideration, this component 40 is formed by an arm section 20a of the robot arm 20. Through this arm section 20a it is also possible to pass into the treatment chamber 12 lines which are required for operating the respective painting robot 18.1, 18.2.

In a modification (not shown specially), the rails 26 can also be arranged in the treatment chamber 12, with the result that the painting robots 18.1, 18.2 are completely within the treatment chamber 12. In this case, the component 40 passed through the gap 36 can, for example, be a bundle of lines for the supply (discussed above) of the painting robots 18.1, 18.2, which are then passed from the outer region 38 to the respective painting robot 18.1, 18.2 in the treatment chamber 12.

As explained at the outset, the intention is largely to prevent atmosphere getting from the treatment chamber 12 into the outer region 38 or from the latter into the treatment chamber 12. For this reason, there is a covering assembly 42, which covers and thereby seals the gap 36 and the side wall 30 of the treatment chamber 12, apart from a first through opening 44a, through which the arm section 20a of the first painting robot 18.1 extends. The through opening 44a follows a movement of said arm section 20a along the gap 36. There is furthermore also covering and sealing of the gap 36, apart from a second through opening 44b, through which the arm section 20a of the second painting robot 18.2 extends; the second through opening 44b follows a movement of the arm section 20a of the second painting robot 18.2 along the gap 36.

Figure 2:
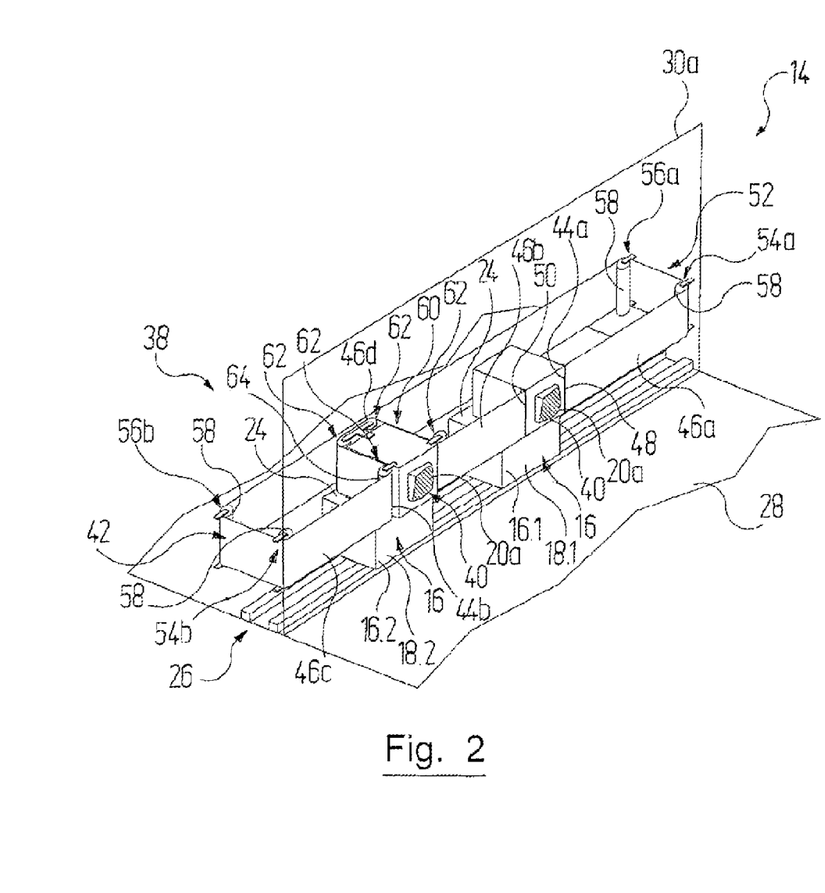
FIG. 2 shows the detail from FIG. 1, wherein the wall is shown as transparent.

In FIG. 2, all that is indicated of the side wall 30 is an external outline 30a, allowing a view of the outer region 38 of the painting booth 14 behind the side wall 30.

As can be seen there, the covering assembly 42 comprises a covering band 46, which extends at the gap 36 and which is fastened in a covering position by a first end on a first fastening side 48 and by its second end on a second fastening side 50 of the first working unit 16.1, that is to say in this case the first painting robot 18.1, wherein the two fastening sides 48, 50 lie opposite one another in the longitudinal direction of the gap 36. Here, covering position means that the covering band 46 extends close enough to the gap 36 to ensure adequate covering and sealing. The fastening sides 48, 50 are situated in the outer region 38 of the painting booth 14. In the illustrative embodiment under consideration, the covering band 46 is in each case fastened on the first painting robot 18.1 on the fastening sides 48, 50 and is fixed there on the carriage 24 of said robot.

In a modification (not shown specially), the covering band 46 can also be fastened on the two fastening sides 48, 50 of the first working unit 16.1 by a fastening device which is designed as a separate module and, for example, is supported separately by means of a dedicated rail guide and is taken along and thereon with the first painting robot 18.1.

The covering band 46 is mounted so as to be movable and is not fixed in a stationary manner. The covering band 46 is the only covering band present and is designed as a covering band which runs around between the fastening sides 48 and 50.

To ensure that the gap 36 is now reliably covered, the covering band 46 is guided over a deflection device 52 from the first fastening side 48 to the second fastening side 48. The deflection device 52 is arranged in the outer region 38, where all of the covering band 46 also extends.

The deflection device 52 comprises two position deflection units 54a, 54b at the longitudinal ends, denoted by 36a and 36b, of the gap 36, by means of which the covering band 46 is guided in a covering position on the gap 36. Moreover, the deflection device 52 comprises further deflection units 56, by means of which the covering band 46 is guided behind the working units 16.1, 16.2 on the side away from the side wall 30 in the outer region 38. In the illustrative embodiment under consideration, there are two such deflection units 56a, 56b.

Of the position deflection units 54a, 54b and the further deflection units 56a, 56b, at least one is designed as a tensioning station, thus ensuring that the covering band 46 is always held under a working tension. A corresponding pretension can be produced by passive devices, such as spring elements, weighted devices or the like. Here, the pretension acting on the covering band 46 can be matched to the forces which occur at the tensioning station during the acceleration of the covering band 46 when one or all the working units 16 present are moved. Tearing of the covering band is thereby prevented.

Moreover, an appropriate pretension can also be brought about by active pretensioning devices, in which the pretensioning force acting on the covering band can be varied continuously. For this purpose, hydraulic, pneumatic or motor-operated systems are suitable, for example. In this case, the pretension can be matched to the known or predetermined acceleration values of the working units 16. For example, the pretension can be actively reduced if a working unit 16 is to perform a rapid movement during which covering band 46 is moved out of the covering region, thus ensuring that the covering band 46 is subject to only slight resistance during its movement.

In the region of the covering band 46 between these deflection units 56a, 56b, the covering band can, for example, be passed through an automatic cleaning device mentioned above (not shown specially here) and can be cleaned on one side or on both sides.

In the illustrative embodiment under consideration, the deflection units 54 and 56 comprise rotatably mounted deflection rollers 58, on which the covering band 46 can roll. Instead of such deflection rollers 58, however, stationary deflection surfaces, over which the covering band 46 slides past the deflection units 56, may also be sufficient.

The covering band 46 is guided from the first fastening side 48 of the first painting robot 18.1 to the second painting robot 18.2, where it is raised from the gap 36 by means of a lifting device 60 and guided past the second painting robot 18.2. The lifting device 60 is taken along by the second painting robot 18.2 and comprises a plurality of lifting/deflection units 62 supported by the latter. In the illustrative embodiment under consideration, the lifting device 60 is arranged on the carriage 24 of the second painting robot 18.2, wherein the lifting/deflection units 62 are positioned along the outer contour of the carriage 24 thereof. The lifting/deflection units 62 of the lifting device 60 comprise rotatably mounted deflection rollers 64, of which only one has a reference sign in each of FIGS. 2 and 4. From the lifting device 60, the covering band 46 runs to the second fastening side 50 of the first painting robot 18.2. Here too, stationary deflection surfaces, over which the covering band 46 slides at the lifting/deflection unit 62, may also be sufficient instead of such deflection rollers 64.

In the case of a modification (not shown specially), it is also possible for the lifting device not to be supported by the second painting robot 18.2 but to be designed as a separate module which is mounted in such a way that it can be moved separately and which can follow the movement of the second painting robot 18.2, e.g. by means of a dedicated rail guide, and thus be taken along with said robot.

In the covering assembly 42, the covering band 46 has various covering sections 46a, 46b and 46c and a lifting section 46d. A first covering section 46a extends from the position deflection unit 54a at the first longitudinal end 36a of the gap 36 as far as the first fastening side 48 on the first painting robot 18.1. A second covering section 46*b* extends from the second fastening side 50 of the first painting robot 18.1 as far as the second painting robot 18.2, where it is received by the lifting device 60. A third covering section 46*c* of the covering band 46 then extends from the second painting robot 18.2, from which it runs out of the lifting device 60, as far as the second position deflection unit 54*b* at the second longitudinal end 36*b* of the gap 36. The section of the covering band 46 which is received by the lifting device 60 defines the lifting section 46*d*; this is situated between covering sections 46*b* and 46*c*.

When the first painting robot 18.1 is then stationary, for example, and the second painting robot 18.2 moves toward the first painting robot 18.1, the lifting section 46*d* guided by the lifting device 60 moves, wherein the covering section 46*b* between the painting robots 18.1, 18.2 shortens, whereas the covering section 46*c* between the second painting robot 18.2 and the second longitudinal end 36*b* of the gap 36 lengthens.

When the first painting robot 18.1 is stationary, that part of the covering band 46 which is visible at the gap 36 is fundamentally not moved in the longitudinal direction of the gap 36; only the lifting section 46*d* thereof shifts.

If, in contrast, the first painting robot 18.1 is moved along the gap 36, the covering band 46 is also moved in the same way along the gap.

The covering assembly 42 explained with reference to FIGS. 1 and 2 can also be used with gaps other than those which extend in a horizontal direction and in a vertical plane.

Figure 3:
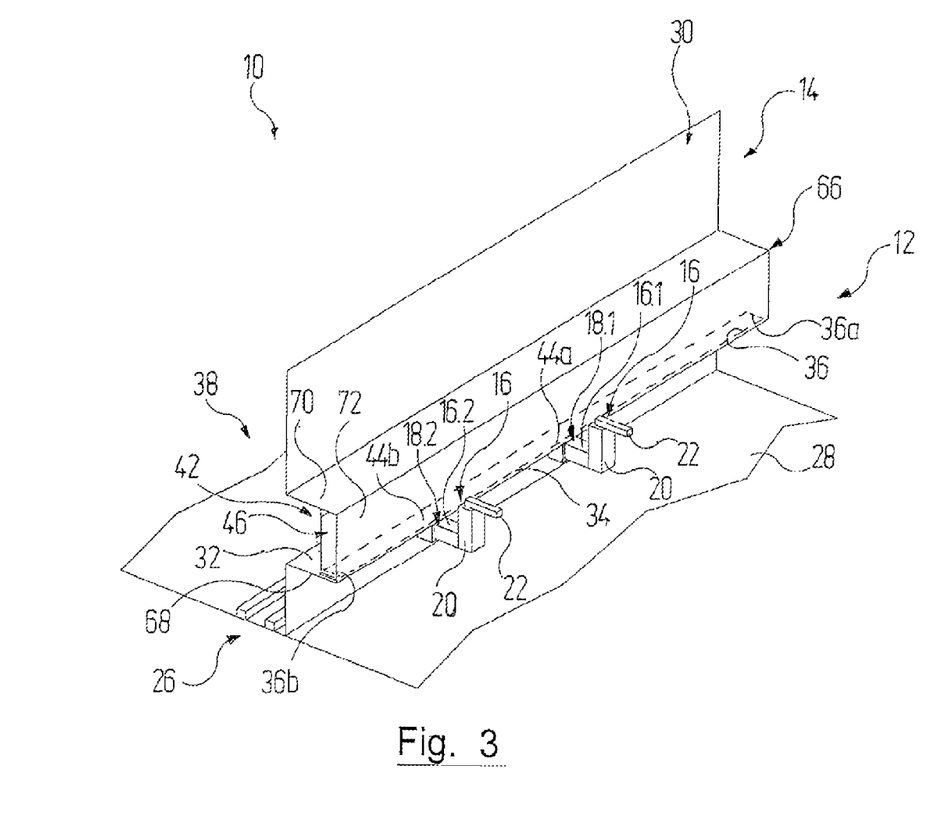
FIG. 3 shows, in perspective, a segment of a painting booth in accordance with a second illustrative embodiment, having a booth wall, in which there is a gap between two horizontal wall sections, through which two working units extend into the treatment chamber, wherein the gap is covered by a covering assembly.
Figure 4:
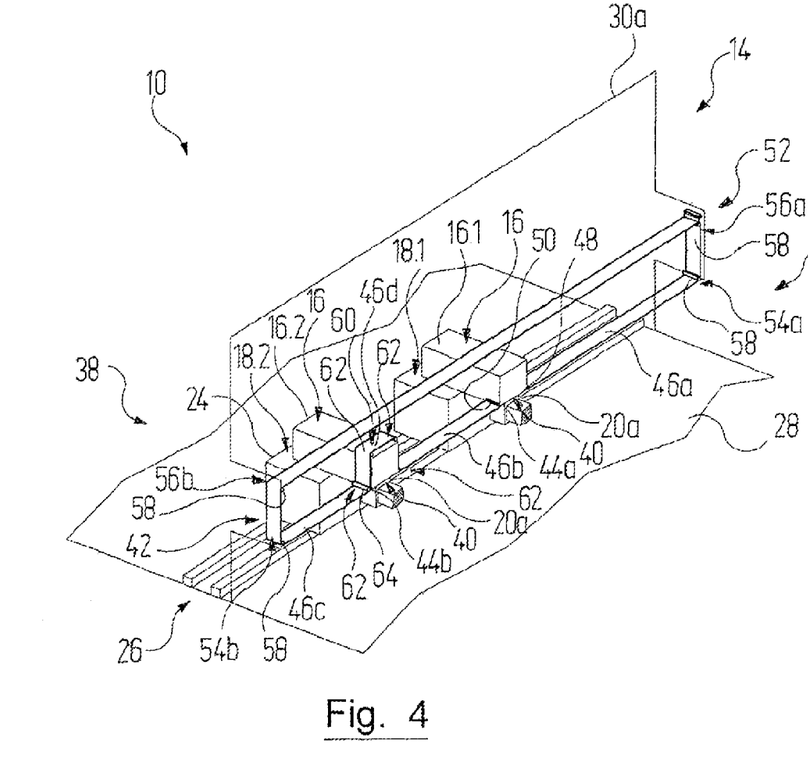
FIG. 4 shows the detail from FIG. 3, wherein the wall is shown as transparent.

As a second illustrative embodiment, FIGS. 3 and 4 show a treatment booth 12 having a side wall 30, in which the gap 36 extends in a horizontal plane; in this case, the direction of the gap 36 is always horizontal. Components that correspond to one another functionally bear the same reference numerals in FIGS. 3 and 4 as in FIGS. 1 and 2.

There, the side wall 30 has a bulge 66 into the treatment chamber 12, said bulge being formed by a lower and an upper horizontal wall part 68 and 70, which are connected to one another by a vertical wall part 72.

There, the first wall section 32 is a wall section of the lower horizontal wall part 68 which faces the outer region 38, and there, the second wall section 34 is a wall section of the lower horizontal wall part 68 which faces the treatment chamber 12, as a result of which the gap 36 extends in a horizontal plane. In FIG. 3, the gap 36 is shown in dashed lines, being viewed through the side wall 30. In FIG. 4 it is once again only the external outline 30*a* of the side wall 30 which is shown. Likewise, only one deflection roller 64 on one lifting/deflection unit 62 is provided with a reference sign.

In the illustrative embodiment under consideration, the components 40 of the two working units 16.1, 16.2, which extend out of the outer region 38, through the gap 36, into the treatment chamber 12, extend from the top down and are visible only in FIG. 4. Here, a part 74 of the painting robots 18.1 and 18.2 is accommodated in the bulge 66; the robot arm 20 projects downward from this part 74.

In other respects, what has been stated above in respect of the treatment device 10 shown in FIGS. 1 and 2 applies accordingly.

In the illustrative embodiments explained above, two working units 16 are shown in each case. However, the treatment device 10 can also have more than two working units 16, of which several then carry a lifting device 60 such as that on working unit 16.2. In this case, there can also be different working units 16, e.g. two painting robots and two handling robots or the like if four working units 16 are provided.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

I claim:

1. A device for treating objects comprising:
   a) a treatment chamber, which has at least one wall having a first wall section and a second wall section, wherein a gap extending in the at least one wall is formed between the first wall section and the second wall section;
   b) at least one first working unit and one second working unit which each comprise at least one component which extends from an outer region outside the treatment chamber through the gap into the treatment chamber, wherein the at least one first working unit and the second working unit move along the gap;
   c) a covering assembly, which seals the gap in the at least one wall of the treatment chamber, apart from
      ca) a first through opening, through which the at least one component of the at least one first working unit extends and which follows a movement of the at least one component of the at least one first working unit along the gap;
      cb) a second through opening, through which the at least one component of the second working unit extends and which follows a movement of the at least one component of the second working unit along the gap; wherein
   d) the covering assembly comprises a covering band, which extends at the gap and which is fastened on a first fastening side and on a second fastening side of the at least one first working unit, wherein the two fastening sides lie opposite one another in a longitudinal direction of the gap; wherein
   e) the covering band is guided over a deflection device from the first fastening side to the second fastening side of the at least one first working unit; and
   f) the covering band is guided from the first fastening side of the at least one first working unit to the second working unit, where it is lifted away from the gap by means of a lifting device and guided past the second working unit.

2. The device as claimed in claim 1, wherein the deflection device is arranged in the outer region.

3. The device as claimed in claim 1, wherein the deflection device comprises a plurality of deflection units.

4. The device as claimed in claim 3, wherein the deflection units each comprise a deflection roller or a deflection surface for the covering band.

5. The device as claimed in claim 1, wherein the lifting device is supported by the second working unit.

6. The device as claimed in claim 1, wherein the lifting device comprises a plurality of lifting/deflection units.

7. The device as claimed in claim 6, wherein the lifting/deflection units each comprise a deflection roller or a deflection surface for the covering band.

8. The device as claimed in claim 1, wherein the first wall section and the second wall section extend in a vertical plane, and wherein the gap extends in the vertical plane.

9. The device as claimed in claim 1, wherein the first wall section and the second wall section each comprise a horizontal wall part of the at least one wall, and wherein the gap also extends in a horizontal plane.

10. The device as claimed in claim 1, wherein the at least one first working unit and the one second working unit are painting robots.

* * * * *

UNITED STATES PATENT AND TRADEMARK OFFICE
CERTIFICATE OF CORRECTION

| | |
|---|---|
| PATENT NO. | : 9,956,570 B2 |
| APPLICATION NO. | : 15/506354 |
| DATED | : May 1, 2018 |
| INVENTOR(S) | : Michael Friedel |

It is certified that error appears in the above-identified patent and that said Letters Patent is hereby corrected as shown below:

In Column 9, Line 4 Before the word "extends" please delete the word "also".

Signed and Sealed this
Twenty-sixth Day of June, 2018

Andrei Iancu
*Director of the United States Patent and Trademark Office*